United States Patent [19]

Wolcott

[11] Patent Number: 4,520,284
[45] Date of Patent: May 28, 1985

[54] ROLLED HOUSING FOR EDDY CURRENT COUPLING

[75] Inventor: John H. Wolcott, Bristol, Wis.

[73] Assignee: Eaton Corporation, Cleveland, Ohio

[21] Appl. No.: 612,980

[22] Filed: May 23, 1984

Related U.S. Application Data

[63] Continuation of Ser. No. 522,446, Aug. 12, 1983, abandoned.

[51] Int. Cl.³ .............................................. H02K 15/00
[52] U.S. Cl. ...................................... 310/42; 310/89; 310/105
[58] Field of Search ................... 310/42, 105, 89, 90, 310/254, 258, 259

[56] References Cited

U.S. PATENT DOCUMENTS 4,118,644  10/1978  Schulte et al. .................... 310/42
4,138,618   2/1979  Jaeschke .......................... 310/105
4,186,319   1/1980  Dochterman ....................... 310/89

Primary Examiner—Donovan F. Duggan
Attorney, Agent, or Firm—C. H. Grace; M. L. Union

[57] ABSTRACT

An eddy current coupling (11) includes a housing (13, 15, 17), a rotor member (29), inductor drum means (25) rotatable about an axis of rotation relative to the rotor member and coil means (41) for electro-magnetically coupling the rotor member and inductor drum means. The housing includes a non-circular central portion (13) having an opening at both ends thereof which is expandable in a radial direction perpendicular to the axis of rotation and first (15) and second (17) end members. The central portion of the housing defines a chamber (80) for receiving the rotor member, inductor drum means and coil means. The first and second end members include pilot surfaces (84, 90) thereon. The end member 15 is adapted to have the pilot surfaces (84) thereon received in one end of the central portion (13) of the housing and the end member (17) is adapted to have the pilot surfaces (90) thereon received in the other end of the central portion (13) of the housing to enclose the chamber in the central portion of the housing and to expand the central portion of the housing in a radial direction to a diameter equal to the diameter of the pilot surfaces on the end members.

22 Claims, 7 Drawing Figures

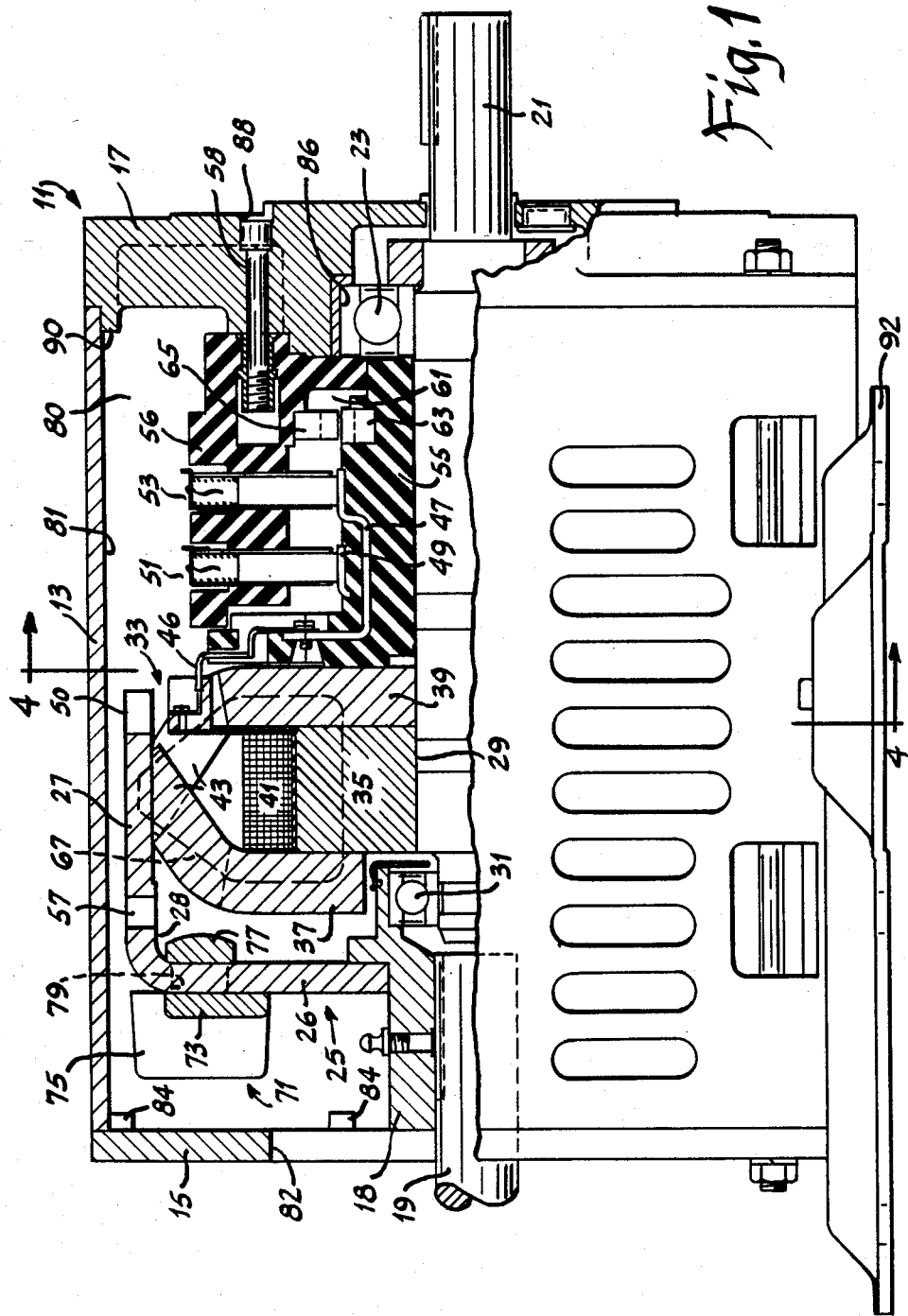

ROLLED HOUSING FOR EDDY CURRENT COUPLING

This is a continuation, of application Ser. No. 522,446, filed Aug. 12, 1983, now abandoned.

BACKGROUND OF THE DISCLOSURE

1. Field of the Invention

The present invention relates to an electro-magnetic or dynamoelectric device, and more particularly to a new housing for such a device which includes a central housing and a pair of end members wherein the central housing is dimensionally stable, accurate and does not require extensive machining of the central housing or end members.

Electro-magnetic couplings of the type are well known in the art and include a rotor which is disposed within a rotatable inductor drum. A coil is energized to generate a field which electro-magnetically couples the rotor and drum so that torque may be transferred therebetween. The rotor, inductor drum and coil are all located and supported by a housing assembly. The mounting of the inductor drum relative to the rotor is critical in that a dimensionally stable air gap must be maintained therebetween to allow for relative rotation of the inductor drum and rotor and across which the field must pass. Additionally, the rotor and inductor drum member must be supported within the housing to allow relative rotation therebetween without interfering with the housing. The concentric mounting of the rotor member, inductor drum and coil typically require conventional housings that are machined to a tolerance in the area of plus or minus one thousandth of an inch. The conventional housings are usually fully machined housings of a casting or heavy weldment. The prior art results in a structurally sound, dimensionally accurate and quite expensive housing. The present invention describes a new and improved housing to achieve adequate structural rigidity and dimensional accuracy at a greatly reduced cost by using a one piece mandrel formed sheet steel design for the central portion of the housing.

2. Prior Art

The Jaeschke U.S. Pat. No. 4,362,958 discloses a typical electro-magnetic coupling and a housing therefore wherein the housing is machined to tight tolerances.

The Kohler Company manufactures a portable gasoline powered alternator which uses a similarly shaped housing which has a cross sectional configuration substantially identical to the cross sectional configuration of the present housing. However, Kohler does not utilize a housing which expands in a radial direction to obtain a zero clearance pilot fit. Kohler utilizes an alternator stator which is pressed into the housing before the end brackets are installed thereby preshaping the housing. This precludes any further reshaping of the housing by the end brackets or expansion of the housing in a radial direction upon insertion of the end members. In the Kohler housing, the length of the housing is about equal to the diameter. Also, the stator which is press fitted into the housing is disposed adjacent the end of the housing. Thus, press fitting the stator into the housing preshapes the housing and there is not enough metal extending from either side of the housing away from the stator to allow the end members to reshape the housing.

The Allendorph Pat. No. 3,321,654, discloses a dynamoelectric machine frame which utilizes a sheet steel housing. Allendorph has a generally circular construction which slightly deforms when the stator is fitted therein. The insertion of the end frames returns the housing to a circular form. The use of a circular housing limits the interference fit that can be utilized due to the circular configuration of the housing. Allendorph has a maximum of 0.005 inches interference fit between the end frames and the central portion of the housings.

SUMMARY OF THE INVENTION

The present invention relates to a new and improved dynamoelectric machine which utilizes a housing having a central portion which has a non-circular cross-sectional configuration to allow the central portion of the housing to expand in a radial direction when the end members are attached to the central portion. The end members include pilot surfaces thereon to fit the pilot diameter of the central portion of the housing.

Another provision of the present invention is to provide a new and improved dynamoelectric machine including a housing having a longitudinal axis, first and second relatively rotatable mechanisms disposed in and spaced apart from said housing and an output member connected to one of the first and second mechanisms for rotation therewith. The housing includes a central portion having a non-circular cross-sectional configuration and defines an elongate chamber which is adapted to receive the first and second mechanisms therein which are spaced apart from the central portion of the housing. The central portion of the housing is expandable in a radial direction and the first and second end members have pilot surfaces thereon, one of which is adapted to have the pilot surfaces thereon received in one end of said central portion and the other of which is adapted to have the pilot surfaces thereon received in the other end of said central portion for enclosing the first and second mechanisms in the elongate chamber and for radially expanding the central portion of the housing to a diameter equal to the diameter of the pilot surfaces of the first and second end members. The central portion of the housing has a non-circular cross-sectional configuration subsequent to the central portion of the housing being radially expanded by the pilot surfaces of the first and second end members.

Still another provision of the present invention is to provide a new and improved eddy current coupling including a housing, a rotor located in the housing, inductor drum means located in the housing and rotatable about an axis of rotation relative to the rotor member and coil means located in the housing for producing an electro-magnetic field for electro-magnetically coupling the rotor member and the inducor drum means. The housing includes a central portion having a non-circular cross-sectional configuration and has openings at both ends thereof. The central portion is expandable in a radial direction perpendicular to the axis of rotation and further includes first and second end members. The central portion of the housing defines a chamber which is adapted to receive the rotor member, inductor drum means and coil means. The central portion of the housing has a length which is at least twice as long as the diameter of the central portion of the housing. The first and second end members include pilot surfaces thereon. One of the first and second end members is adapted to have the pilot surfaces thereon received in one end of the central portion of the housing and the other of the first and second end members is adapted to have the pilot surfaces thereon received in the other end of the central portion of the housing to thereby enclose the chamber in the central portion of the housing and to expand the central portion of the housing in a radial direction to a diameter substantially equal to the diameter of the pilot surfaces of the first and second end members. The central portion of the housing includes first, second, third and fourth sides disposed parallel to the axis of rotation. Each of the sides includes first and second portions disposed parallel to the axis of rotation and the first and second portions of each of the sides are interconnected by a flexible arcuate portion which allows the first and second portions to flex outwardly upon engagement therewith with the pilot surfaces of the first and second end members.

A still further provision of the present invention is to provide a new and improved dynamoelectric machine including a housing, a motor, a stator, a motor rotor, a rotor member, an inductor drum means and coil means all of which are located in the housing. The housing includes a non-circular central portion having an opening at both ends and which is expandible in a radial direction. The central portion of the housing defines a chamber which is adapted to receive the stator, the motor rotor, the rotor member, the inductor drum means and the coil means therein with the stator being press fitted in the central portion of the housing. The central portion of the housing has a length which is at least twice as long as the diameter of the central portion of the housing. The first and second end members include pilot surfaces thereon which are adapted to be received in the ends of the central portion of the housing to thereby enclose the central portion of the housing and expand the central portion in a radial direction to a dimension controlled by the dimension of the pilot surfaces of the first and second members. The central portion of the housing has a non-circular configuration subsequent to the stator being press fitted therein and subsequent to the central portion of the housing being expanded by the pilot surfaces of the first and second end members.

DESCRIPTION OF THE DRAWINGS

FIG. 1 is an axial half section of a typical dynamo electric coupling to which the housing of the present invention may be adapted.

DESCRIPTION OF THE PREFERRED EMBODIMENT

Figure 4:
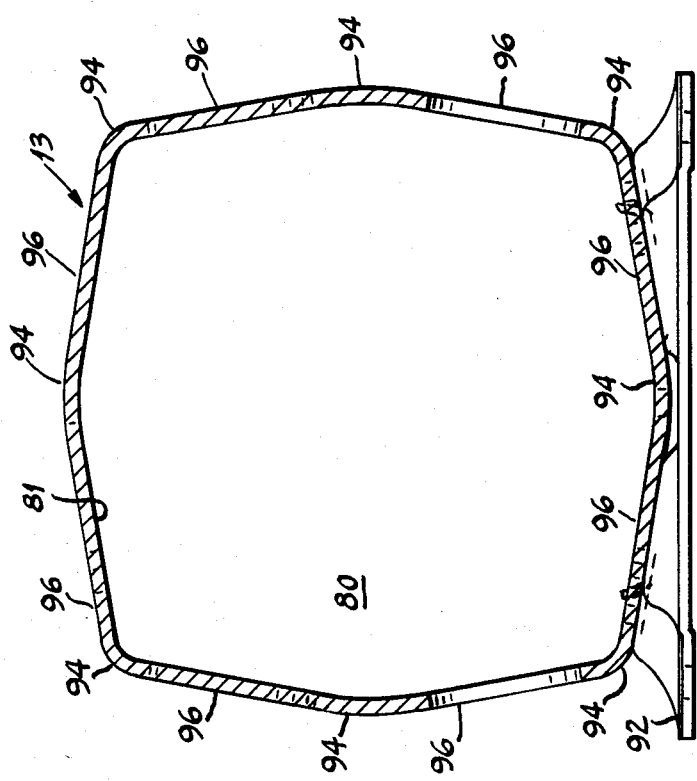
FIG. 4 is a cross-sectional view of the housing taken approximately along lines 4—4 of FIG. 1.

FIG. 1 is a longitudinal half section of a typical eddy-current coupling device to which the present invention may be adapted. The coupling device, generally designated 11, includes a central housing 13 and end members 15 and 17. The end member 15 includes a central opening therein for receiving a drive shaft 19 and the end member 17 supports a driven shaft 21, which in part is supported by a set of bearings 23 supported in the end member 17.

Figure 5:
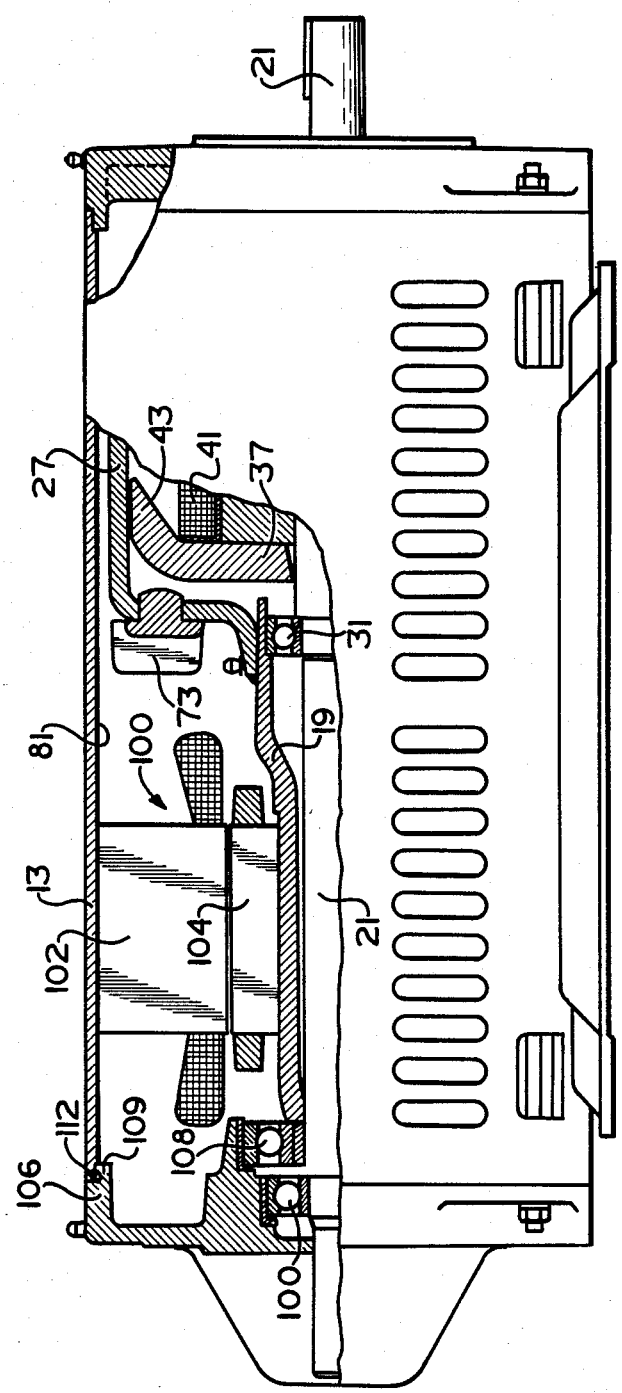
FIG. 5 is a partial axial half section of another embodiment of a typical dynamoelectric coupling and a driving motor therefor to which the housing of the present invention may be adapted.
Figure 6:
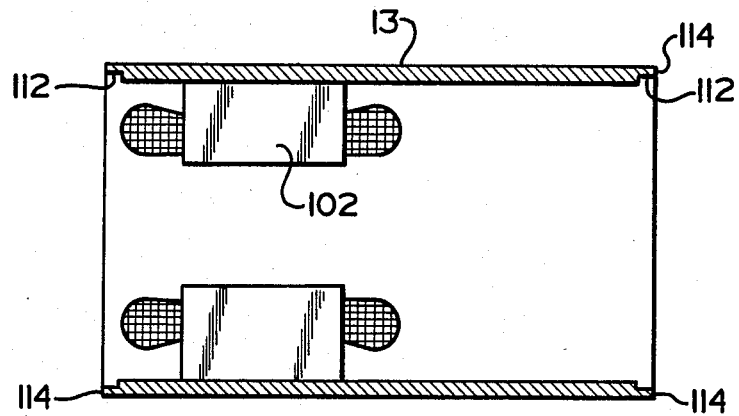
FIG. 6 is a schematic view of the housing with the motor stator press fitted in place.

The drive shaft 19 may be driven in a well known manner by a prime mover such as a motor, not illustrated. The motor may include a lip which engages with an opening 82 on the end member 15. The engagement of the lip on the motor with the surface 82 positively locates the motor and the drive shaft 19 relative to the end plate 15. Such a construction would support the motor on the outside of the housing and allow easy replacement of the motor. However, if desired, the central portion 13 of the housing could be extended to locate the motor within the central portion of the housing as is illustrated in FIG. 5 and which will be more fully explained hereinafter. In any event, the positioning of the motor in the central portion of the housing or on the end plate 15 will accurately locate the drive shaft 19 within the housing of the coupling 11.

Keyed to the drive shaft 19 is an inductor assembly or inductor drum means 25 including a hub portion 18, a radially extending portion 26 and a cylindrical inductor drum portion 27 which will be described in greater detail subsequently, but which is composed of a ferro magnetic material such as steel and which may have a substantially uniform magnetic reluctance.

Keyed to the driven shaft 21 for rotation therewith is a magnetic field pole assembly or rotor assembly 29. Both the rotor assembly 2a and the inductor drum 25 are spaced apart from the central portion of the housing. A pilot bearing 31 is mounted on the end of the driven shaft 21 and is supported by the drive shaft 19 and the driven shaft 21. The pilot bearing 31 provides for rotation of the inductor drum assembly 25 relative to the pole assembly 29. The pilot bearing 31 positions the inductor drum assembly 25 in the central portion of the housing 13 relative to the pole assembly 29 which is supported on the driven shaft 21 for rotation therewith. The pilot bearing 31 maintains a radial air gap or clearance between the inductor assembly 25 and the pole assembly 29 to provide for relative rotation therebetween.

The field pole assembly 29 includes a magnetic pole assembly 33, comprising a magnetic ring 35 supported on the shaft 21 and a pair of pole members 37, 39. A field coil 41 is supported on the magnetic ring 35 to energize the magnetic pole assembly 33. The pole members 37 and 39 carry pole teeth or poles 43 thereon which are interdigitated. The pole teeth 43 are disposed adjacent to an innersurface 28 of the cylindrical portion 27 of the inductor drum assembly 25. A narrow air gap or space is provided between the poles 43 and the innersurface 28 of the inductor drum portion 27 to provide for relative rotation between the inductor drum assembly 25 and the pole assembly 29. As indicated herein above, the pilot bearing 31 is supported by the drive shaft 19 and inductor drum assembly 25 and on the driven shaft 21 to thereby locate the drive shaft 19 and the inductor drum assembly 25 relative to the pole assembly 29 and to maintain the axial air gap therebetween which allows the inductor drum assembly and the pole assembly 29 to rotate relative to each other.

The field coil 41 is energized via a pair of leads 46. Leads 46 are connected to slip rings 47 and 49 which are supported on a slip ring support 55 which is supported on the output shaft 21 for rotation therewith. A pair of brush assemblies 51, 53 are supported in a brush holder 56 which is supported on end cap 17 by the bolt and nut assembly 58. The brush assemblies 51 and 53, respectively, contact the slip rings 49 and 47. The brush assemblies 51 and 53 are energized via leads, not illustrated, in a well-known manner. The brush assemblies 51 and 53 operate to transfer electrical energy to the field coil 41 via the leads 46 and slip rings 47, 49.

A tachometer generator assembly 61 may be associated with the present coupling. The tachometer generator 61 is operable to establish a signal on an output line thereof, not illustrated, which is indicative of the speed of the output shaft 21 and which signal may be utilized by electrical circuitry, not illustrated, to control the speed of the output shaft 21, in a well-known manner. The tachometer generator 61 includes a plurality of permanent magnetic poles 63 which are supported for rotation by the slip ring support member 55 which rotates with output shaft 21. A stator assembly 65 is disposed adjacent to the permanent magnet poles 63 of the tachometer generator 61 and is operable to have a current induced therein, in a well-known manner, which is proportional to the speed of the output shaft 21.

Energization of the field coil 41 establishes a flux path, represented by the dotted lines 67 in FIG. 1, which electromagnetically couples the field pole assembly 29 and the inductor drum assembly 25 so that rotation of the inductor drum assembly 25 by the driven input shaft 19 effects rotation of the pole assembly 29 and output shaft 21 connected thereto in a well-known manner. The magnitude of the energization of field coil 41 controls the slip between the pole assembly 29 and the inductor drum assembly 25 in a well-known manner.

During the operation of the electromagnetic coupling device 11, relative rotation between the pole assembly 29 and inductor drum assembly 25 results in the generation of eddy currents in the cylindrical portion 27 of the inductor drum. These eddy currents produce a magnetic field which permits the transmission of torque from the inductor drum assembly 25 to the pole assembly 29 as discussed above. Normally, a certain amount of "slip" occurs during the rotation of the inductor drum assembly 25 and the pole assembly 29 and such "slip", or difference in rotational speed between the pole assembly 29 and inductor drum assembly 25, generates heat in the inductor drum assembly 25. The cylindrical portion 27 of the inductor drum assembly 25 includes a plurality of axially extending teeth 50 disposed on the end portion thereof. These teeth 50 and the notches in between act to dissipate heat generated in the cylindrical portion 27 of the inductor drum assembly 25. The inductor drum assembly 25 further includes a plurality of radially extending openings 57 arranged in an annular array about the cylindrical portion 27 of the inductor drum assembly 25. The openings 57 are adapted to have a cooling medium such as air flow therethrough to dissipate heat generated in the inductor drum assembly 25.

The inductor drum assembly 25 includes a heat dissipating member 71 disposed on the radially extending portion 26 thereof. The heat dissipating member 71 comprises an annular ring portion 73 having a heat dissipating surface thereon which includes a plurality of fins 75 extending therefrom in a direction substantially parallel to the axis of rotation of the drum assembly 25 and a plurality of fastening means or rivets 77 which also extend parallel to the axis of rotation but in a direction opposite to that in which the fins 75 extend. The heat dissipating member 71 is operable to rotate with the inductor drum assembly 29 and dissipate heat generated in the inductor drum assembly 29 by the eddy current action. The rivet means or rivet members 77 are integrally formed with the heat dissipating member 71 and each rivet 77 is operable to be received in one of a plurality of openings 79 disposed in the radially extending portion 26 of the inductor drum assembly 25. After the rivets 77 are located in the openings 79 the heads of the rivets are deformed to secure the heat dissipating member 71 to the inductor drum assembly 25. By insuring that the rivets 77 are under compression in both an axial and radial direction when the heat dissipating member 71 is attached to the inductor drum assembly 25 greater and more efficient thermal-contact occurs between the rivets of the heat dissipating member 71 and the inductor drum assembly 25. This provides for better heat dissipation from the inductor drum assembly 25 through the rivets 77 and to the fins 75 of the heat dissipating member 71. The fins 75 then dissipate heat to a cooling medium such as air when the inductor drum assembly 25 rotates.

Figure 3:
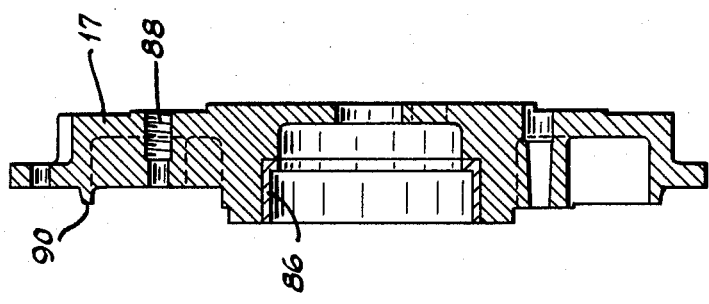
FIG. 3 is a cross-sectional view of the right hand end member illustrated in FIG. 1.
Figure 2:
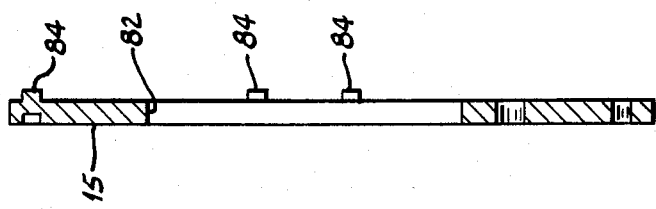
FIG. 2 is a cross-sectional illustration of the left hand end member as illustrated in FIG. 1.

Referring to FIGS. 2, 3 and 4, the housing for the coupling 11 is more fully illustrated. The housing includes a central portion 13 having a non-circular cross-sectional configuration and includes an inner surface 81 which defines a chamber 80 in which the inductor assembly 25, rotor assembly 29 and field coil 41 are located. A mounting plate 92 may be attached to the bottom portion of the central portion 13 of the housing to provide a suitable support for the housing.

The end plate 15, more fully illustrated in FIG. 2 includes an annular opening 82 disposed therein which is adapted to receive the driving shaft 19 therein. The opening 82 allows the driving shaft 19 to project into the chamber 80 and the opening 82 typically provides a pilot diameter to accurately locate the motor (not shown) with respect to the coupling device 11 if the motor is located exteriorly of the housing. A plurality of pilot projections 84 are integrally formed on the end plate 15 and project from one side thereof. The pilot projections 84 are adapted to engage with the interior surface 81 of the central portion 13 of the housing when the end member 15 is secured thereto. When the end plate 15 is secured to the central portion 13 of the housing, the pilot projections 84 engage the inner surface 81 of the central portion 13 and affect radial expansion of the central portion 13 of housing as will be explained more fully hereinafter. The central portion 13 of the housing has a non-circular cross-sectional configuration after it is expanded by the end plate 15.

The end member 15 is preferably a precision stamped member. This will accurately control the pilot diameter of the pilot projections 84. If a precision stamping is not utilized, the outer surfaces of the pilot projections 84 which engage with a inner surface 81 of the central portion 13 could be machined to accurately control the pilot diameter of the end plate 15. While the pilot diameter of the pilot projections 84 is critical, the diameter of the inner surface of the central portion 13 does not have to be the machined surface due to the fact that the central portion 13 expands in a radial direction in response to the pilot projections 84 engaging therewith. Preferably, the diameter of the inner surface 81 is 0.001 inch less than the pilot diameter of the pilot projections 84 but could be as much as 0.025 inches less than the pilot diameter of the pilot projections. Thus, the pilot diameter of the pilot projections 84 effectively control the diameter of the inner surface 81 when the coupling 11 is assembled and the pilot projections 84 affect radial expansion of the central portion 13 and the inner surface 81. The central portion of the housing has a length which is at least twice as long as the diameter of the central portion of the housing. This enables the pilot projections 84 to control the diameter of the housing when the coupling is assembled. If the length of the central portion of the housing was too short when compared to the diameter, the housing would be too rigid and the pilot projections 84 would not act to radially expand the housing to a controlled diameter.

The end member 17 more fully described in FIG. 3 includes a central cavity 86 therein which is designed to support the bearing assembly 23 as is more fully illustrated in FIG. 1. The end member 17 also includes a plurality of openings therein 88 which are adapted to receive fasteners 58 which support the brush holder assembly 56. A plurality of pilot projections 90, one of which is shown in FIG. 3 are integrally formed on the end member 17 and are adapted to engage with the inner surface 81 of the central portion 13 of the housing.

The non-circular cross-sectional configuration of the central portion 13 of the housing is more fully illustated in FIG. 4. The central portion 13 includes four sides disposed substantially parallel to the longitudinal axis of the housing. Each of the sides includes first and second straight portions 96 which are interconnected by plurality of flexible arcuate portions 94 which allow the first and second portions 96 to flex. The box-like cross-sectional configuration of the central portion 13 of the housing allows the central portion 13 to spring open in a radial direction to fit the pilot diameter on the mating pilot projections 84 and 90 on the end members 15 and 17, respectively. Thus, the dimensions of the central portion 13 of the housing will be controlled and fixed by the dimension of the pilot projections 84 and 90 when the end members 15 and 17 are assembled to the central portion 13. This non-circular box-like shape provides for good structural rigidity and the expansion of the housing in a radial direction allows an unmachined central portion of the housing 13 to make a zero clearance fit with the end members 15 and 17 that could otherwise be obtained only by expensive machining. This results in a structurally sound, dimensionally accurate and inexpensive housing. While the housing has been disclosed for use with an eddy current coupling, it should be appreciated that it could be utilized on other types of dynamo-electric machines. The central portion 13 of the housing may be manufactured using a mandrel form sheet steel design which will greatly reduce cost over prior art housing designs.

The chamber 86 in the end member 17 supports and positively locates the bearing 23 which supports the output shaft 21 for rotation. Thus, location of the bearing 23 in the chamber 86 will positively locate the driven shaft 21 relative to the end plate 17 and the central portion of the housing 13 via the pilot surfaces 90 on the end plate 17. The pole assembly 29 is mounted on the shaft 21 for rotation therewith and the bearings 23 will therefore fix the position of the pole assembly 29 relative to the housing. The bearing 31 is also located on the driven shaft 21. The bearing 31 is supported by the inductor drum assembly 25 and therefore the inductor drum assembly 25 is located in part through the bearing 31 and the shaft 21 via the bearings 23. The present construction allows the shaft 21, pole assembly 29 and inductor drum assembly 25 to all be positively supported and located through the bearing 23 relative to the end member 17 and bearing 13. This construction will accurately maintain the radial air gap between the inductor drum assembly 25 and the pole assembly 29 and will allow the inductor drum assembly 25 and the pole assembly 29 to be accurately spaced apart in a radial direction from the central portion of the housing. This provides a distinct advantage over prior art structures wherein the inductor drum was supported relative to one end bracket of the housing and the rotor assembly was supported relative to another end bracket of the housing. In prior art structures such as those, the dimensional accuracy of the mounting end brackets relative to the housing was critical in order to maintain a non-interference fit between the housing, the pole assembly and the inductor drum and to maintain a predetermined radial air gap between the inductor and pole assemblies. In prior art structures, the central portion of the housing is dimensionally fixed and does not change when the end brackets are assembled thereto. The use of the pilot surfaces 84, 90 on the end members 15, 17 respectively, allow unmachined central portion 13 of the housing to be connected to end brackets 15 and 17 and still provide the dimensionally accurate support for the components of the coupling 11 as the pilot surface 84, 90 radially expand the central portion 13 of the housing and fix the dimensional relationship between the end brackets 15, 17 and the central portion 13 of the housing.

Referring to FIG. 5, a further embodiment of the present invention is illustrated. In this embodiment, the central portion 13 of the housing is extended and the motor 100 is located within the central portion of the housing. The motor 100 includes a stator 102 which is press fitted on the interior surface 81 of the central portion of the housing 13. A motor rotor 104 is mounted for rotation on the motor shaft 19 which forms the input to the eddy current coupling. Bearing 108 is provided to support shaft 19 and bearing 110 is provided in the end cap assembly 106 to support the output shaft 21 for rotation. The end cap 106 includes a plurality of pilot projections 108 which engage with pilot surfaces 112 disposed on the end of the central portion of the housing 13. The end member 106 may preferably be die cast and the pilot projections 108 may be machined at their outer pilot surfaces to ensure their accuracy. The construction of the right hand end member for the central portion of the housing 13 as viewed in FIG. 5 is similar in construction to the end member 106 and will not be described herein. Energization of motor 100 will effect rotation of the motor rotor 104 and rotation of shaft 19 to thereby drive the eddy current coupling. The output of eddy current coupling is connected to output shaft 21 to effect rotation thereof in a well-known manner.

The location of the motor 100 in the central portion of the housing 13 requires the maintenance of a higher degree of accuracy in mounting the end members and motor within the housing than when the motor is not mounted within the housing, in order to achieve satisfactory concentric alignment between the stationery and rotational components of the motor. Additionally, when the stator 102 is pressed into the housing 13, the housing is deformed somewhat and becomes more rigid. In order for the end members to deform the ends of the housing 13, it is necessary for the stator 102 to be spaced apart from the end members at least 2" and for the length of the central portion 13 of the housing to be at least twice the diameter of the central portion 13. This construction allows the central portion 13 to be stretched by the end members and then pilot projections. If at least two inches is not maintained between the end of the housing and the stator 102, the housing will not be able to expand to fit the pilot projections 106 due to the inflexibility that the press fitted stator 102 imparts to the housing. Also, if the housing is too short compared to its diameter, the housing also will not be flexible enough to expand radially when the end members are inserted therein. When the rotor 100 is located in the central portion of the housing 13 the pilot diameters 112 and axial faces 114 on each end of the housing 13 are machined in order to maintain the high degree of accuracy necessary for concentric alignment of the motor stator 102 and motor rotor 104. The pilot diameters 112 and axial faces 114 on the ends of the central portion of the housing 13 are machined when the housing is deformed to the shape which it will assume when the stator 102 is assembled therein. This can be accomplished by "stretching" the central portion of the housing 13 on a machining arbor or by assembling the stator 102 to the interior surface 81 of the central portion of the housing 13 prior to machining the pilot diameters 112 and axial faces 114. With the present non-circular housing design, the housing is deformed by as much as 0.025 inch interference when the stator is press fitted therein. Then the housing is machined and the motor and coupling are then assembled into the housing. The degree of accuracy in the assembled coupling and motor is actually better than a conventional cast iron/-fully machined housing costing many times more.

Figure 7:
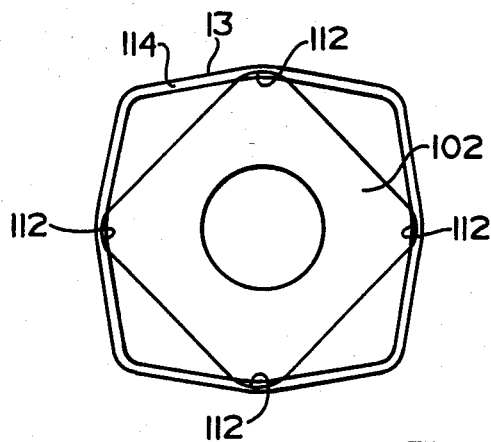
FIG. 7 is an end schematic view of the coupling of FIG. 6.

As is illustrated in FIG. 7, the pilot surfaces 112 are disposed concentric to the longitudinal axis of the housing 13 when the stator 102 is disposed therein. The axial faces 114 are disposed so that the axial faces 114 on each end of the housing are disposed parallel to each other. This assures concentric alignment between the motor rotor 104 and stator 102 which is critical for proper operation of the motor 100. The present construction requires only minimum machining of a sheet metal housing to thereto provide a low cost housing which maintains the required degree of accuracy necessary for concentric alignment between the relatively rotational components of the motor and the coupling.

From the foregoing it should be apparent that a new and improved dynamoelectric machine has been provided. The dynamoelectric machine includes a housing 13, having a longitudinal axis, first and second relatively rotatable mechanisms disposed in the housing and an output member connected to one of the first and second mechanisms for rotation therewith about the longitudinal axis. The housing includes a central portion 13 defining an elongate chamber 18 which is adapted to receive the first and second mechanisms therein and first and second end members 15, 17 having pilot surfaces 84, 90 thereon. The central portion of the housing is expandable in a radial direction. One of the first and second end members is adapted to have the pilot surfaces thereon received in one end of the central portion of the housing and the other of the first and second end members is adapted to have the pilot surfaces thereon received in the other end of the central portion of the housing for enclosing the first and second mechanisms in the elongate chamber and for radially expanding the central portion of the housing to a diameter equal to the diameter of the pilot surfaces of the first and second end members.

What I claim is:

1. An eddy current coupling comprising a housing, a rotor member disposed in said housing, inductor drum means disposed in said housing and rotatable about an axis of rotation relative to said rotor member, and coil means located in said housing for producing an electromagnetic field for electromagnetically coupling said rotor member and said inductor drum means, said housing including a central portion having a non-circular cross-sectional configuration and first and second end members, said central portion of said housing having an opening at both ends thereof and being expandable in a radial direction perpendicular to said axis of rotation, said central portion of said housing having first, second, third and fourth sides disposed parallel to said axis of rotation, each of said sides including first and second portions disposed parallel to said axis of rotation, said central portion of said housing defining a chamber which is adapted to receive said rotor member, said inductor drum means and said coil means therein, said rotor member and said inductor drum means being spaced apart from said central portion of said housing said first and second end members including pilot surfaces thereon, one of said first and second end members being adapted to have the pilot surfaces thereon received in one end of said central portion of said housing and the other of said first and second end members being adapted to have the pilot surfaces thereon received in the other end of said central portion of said housing to thereby enclose said chamber in said central portion of said housing and to expand said central portion of said housing in a radial direction to a dimension controlled by the dimension of said pilot surfaces of said first and second end members, said first and second portions of each of said sides of said housing being interconnected by a flexible arcuate portion which allows said first and second portions to flex outwardly upon engagement therewith with said pilot surfaces of said first and second end members.

2. An eddy current coupling as defined in claim 1 wherein said central portion of said housing is integrally formed from a single piece of sheet metal.

3. An eddy current coupling as defined in claim 1 wherein said central portion of said housing is unmachined and said pilot surfaces on each of said end members tightly engage with the ends of said central portion of said housing to expand said central portion of said housing in a radial direction to a dimension controlled only by the pilot surfaces of said first and second end members.

4. An eddy current coupling as defined in claim 2 wherein said central portion of said housing is unmachined and said pilot surfaces on each of said end members tightly engage with the ends of said central portion of said housing to radially expand and shape said central portion of said housing.

5. An eddy current coupling as defined in claim 1 further including first bearing means supported by one of said end members, said one end member and said first bearing means supporting said rotor member for rotation relative to said housing, and second bearing means supported and located at least indirectly by said one end member and said first bearing means, said second bearing means supported by said inductor drum means, said first and second bearing means located at least indirectly by said one end member acting to support and locate said rotor member and said inductor drum means within said central portion of said housing for relative rotation about said axis of rotation and maintaining a predetermined radial air gap between said inductor drum means and said rotor member.

6. An eddy current coupling as defined in claim 4 further including first bearing means supported by one of said end members, said one end member and said first bearing means supporting said rotor member for rotation relative to said housing, and second bearing means supported and located at least indirectly by said one end member and said first bearing means, said second bearing means supported by said inductor drum means, said first and second bearing means located at least indirectly by said one end member acting to support and locate said rotor member and said inductor drum means within said central portion of said housing for relative rotation about said axis of rotation and maintaining a predetermined radial air gap between said inductor drum means and said rotor member and maintaining a predetermined radial gap between said inductor drum and said central portion of said housing.

7. An eddy current coupling as defined in claim 6 wherein said housing has a cross-sectional configuration taken approximately perpendicular to said axis of rotation which allows said housing to expand in a radial direction.

8. An eddy current coupling as defined in claim 1 further including first bearing means supported by one of said end members, a shaft supported by said one end member and said first bearing means for rotation, said rotor member being supported on said shaft for rotation therewith and second bearing means supported in part by said shaft and said inductor drum means, said first and second bearing means, said shaft, and said one end end member acting to support and locate at least in part said rotor member and said inductor drum means within said central portion of said housing for relative rotation about said axis of rotation and for maintaining a predetermined radial gap between said inductor drum and said central portion of said housing.

9. A dynamoelectric machine comprising a housing having a longitudinal axis, first and second relatively rotatable mechanisms disposed in said housing, and an output member connected to one of said first and second mechanisms for rotation therewith about said longitudinal axis, said housing including a central portion having a non-circular cross-sectional configuration and defining an elongate cavity therein which is adapted to receive said first and second mechanisms therein and first and second end members, said first and second mechanisms being spaced apart in a radial direction from said central portion of said housing, said central portion of said housing having an opening at both ends thereof and being expandable in a radial direction perpendicular to said longitudinal axis, said first and second end members having pilot surfaces thereon, one of said first and second end members being adapted to have said pilot surfaces thereon received in one end of said central portion of said housing and the other of said first and second end members being adapted to have the pilot surfaces thereon received in the other end of said central portion of said housing for enclosing said first and second mechanisms in said elongate cavity and for radially expanding said central portion of said housing to a diameter equal to the diameter of said pilot surfaces of said first and second end members, said central portion of said housing having a non-circular cross-sectional configuration subsequent to said central portion of said housing being radially expanded by said pilot surfaces of said first and second end members.

10. A dynamoelectric machine as defined in claim 9, wherein said central portion of said housing is integrally formed from a single piece of sheet metal.

11. A dynamoelectric machine as defined in claim 9, wherein said central portion of said housing is unmachined and said pilot surfaces on each of said end members tightly engage with the ends of said central portion of said housing to expand said central portion of said housing in a radial direction to a dimension controlled only by the dimension of said pilot surfaces of said first and second end members.

12. A dynamoelectric machine as defined in claim 9, further including first bearing means supported by one of said end members, said one end member and said first bearing means supporting one of said first and second relatively rotatable mechanisms, and second bearing means supported by and located at least indirectly by the other of said first and second relatively rotatable mechanisms, said first and second bearing means located at least indirectly by said one end member acting to support and locate said first and second relatively rotatable mechanisms within said central portion of said housing for relative rotation about said axis of rotation and maintaining a predetermined radial air gap between said first and second relatively rotatable mechanisms.

13. A dynamoelectric machine comprising a housing having a longitudinal axis, first and second relatively rotatable mechanisms disposed in said housing, and an output member connected to one of said first and second mechanisms for rotation therewith about said longitudinal axis, said housing including a central portion having a non-circular cross-sectional configuration taken substantially perpendicular to said longitudinal axis and defining an elongate cavity therein which is adapted to receive said first and second mechanisms therein and first and second end members, said central portion of said housing having a length which is at least twice as long as the diameter of said central portion of said housing, said central portion of said housing having an opening at both ends thereof, said first and second end members having pilot surfaces thereon, one of said first and second end members being adapted to have said pilot surfaces thereon received in one end of said central portion of said housing and the other of said first and second end members being adapted to have the pilot surfaces thereon received in the other end of said central portion of said housing for enclosing said first and second mechanisms in said elongate cavity and for changing the cross-sectional shape of said central portion of said housing in a direction perpendicular to said longitudinal axis to a shape controlled by said pilot surfaces of said first and second end members and to a cross-sectional shape which is non-circular.

14. A dynamoelectric machine comprising a housing, a motor disposed in said housing including a stator and a motor rotor, an eddy current coupling disposed in said housing including a rotor member, inductor drum means rotatable about an axis of rotation relative to said rotor member, and coil means for producing an electromagnetic field for electromagnetically coupling said rotor member and said inductor drum means, said motor being operable to drive said inductor drum means, said housing including a central portion having a non-circular cross-sectional configuration and having an opening at both ends thereof and which is expandable in a radial direction perpendicular to said axis of rotation and first and second end members, said central portion of said housing defining a chamber which is adapted to receive said stator, said motor rotor, said rotor member, said inductor drum means and said coil means therein, said stator being press fitted in said central portion of said housing to expand an intermediate portion of said central portion of said housing said first and second end members including pilot surfaces thereon, one of said first and second end members being adapted to have the pilot surfaces thereon received in one end of said central portion of said housing and the other of said first and second end members being adapted to have the pilot surfaces thereon received in the other end of said central portion of said housing to thereby enclose said chamber in said central portion of said housing, said central portion of said housing having a length which is at least twice as long as the diameter of said central portion of said housing which enables said central portion of said housing to expand in a radial direction to a dimension controlled by the dimension of said pilot surfaces of said first and second end members, said central portion of said housing having a non-circular cross-sectional configuration subsequent to said stator being press fitted therein and subsequent to said central portion of said housing being expanded by said pilot surfaces of said first and second end members.

15. A dynamoelectric machine as defined in claim 14 wherein said ends of said central portion of said housing each include an axial face, said axial faces being parallel to each other when said central portion of said housing is deformed to the cross-sectional configuration that said central portion assumes when said stator is press fitted therein and said end members expand said central portion of said housing.

16. A dynamoelectric machine as defined in claim 14 wherein a pilot diameter is disposed on each of said ends of said central portion of said housing to facilitate the reception of each of said end members and pilot surfaces thereon within the ends of said central portion of said housing.

17. A dynamoelectric machine as defined in claim 15 wherein a pilot diameter is disposed on each of said ends of said central portion of said housing to facilitate the reception of each of said end members and pilot surfaces thereon within the ends of said central portion of said housing.

18. A dynamoelectric machine as defined in claim 17 wherein said central portion of said housing is integrally formed from a single piece of sheet material.

19. A dynamoelectric machine as defined in claim 18 wherein said central portion of said housing includes first, second, third and fourth sides disposed parallel to said axis of rotation, each of said sides including first and second portions disposed parallel to said axis of rotation, said first and second portions of each of said sides of said housing being interconnected by a flexible arcuate portion which allows said first and second portions to flex outwardly upon engagement therewith with said pilot surfaces of said first and second end members.

20. A dynamoelectric machine as defined in claim 14 wherein said central portion of said housing includes first, second, third and fourth sides disposed parallel to said axis of rotation, each of said sides including first and second portions disposed parallel to said axis of rotation, said first and second portions of each of said sides of said housing being interconnected by a flexible arcuate portion which allows said first and second portions to flex outwardly upon engagement therewith with said pilot surfaces of said first and second end members.

21. A dynamoelectric machine as defined in claim 14 wherein said stator which is press fitted into said central portion of said housing is fixed a distance greater than 2" from each of said ends of said central portion of said housing.

22. A dynamoelectric machine as defined in claim 19 wherein said stator which is press fitted into said central portion of said housing is fixed a distance greater than 2" from each of said ends of said central portion of said housing.

* * * * *